United States Patent
Shoham et al.

(10) Patent No.: US 6,715,046 B1
(45) Date of Patent: Mar. 30, 2004

(54) METHOD AND APPARATUS FOR READING FROM AND WRITING TO STORAGE USING ACKNOWLEDGED PHASES OF SETS OF DATA

(75) Inventors: Doron Shoham, Shoham (IL); Shimon Listman, Tel Mond (IL)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 09/998,470

(22) Filed: Nov. 29, 2001

(51) Int. Cl.[7] .............................................. G06F 12/00
(52) U.S. Cl. ........................ 711/158; 711/118; 711/165; 713/502
(58) Field of Search ........................... 710/52, 54, 309, 710/310; 711/118, 147, 154, 156, 158, 159, 165, 217, 219; 713/502

(56) References Cited

U.S. PATENT DOCUMENTS

| | | | | |
|---|---|---|---|---|
| 5,530,851 A | * | 6/1996 | Fortier | 707/2 |
| 5,630,075 A | | 5/1997 | Joshi et al. | |
| 6,088,734 A | * | 7/2000 | Marin et al. | 709/232 |
| 6,122,715 A | | 9/2000 | Palanca et al. | |
| 6,134,217 A | * | 10/2000 | Stiliadis et al. | 370/232 |
| 6,230,243 B1 | * | 5/2001 | Elko et al. | 711/130 |
| 6,330,645 B1 | | 12/2001 | Harriman | |
| 6,334,171 B1 | | 12/2001 | Hill et al. | |
| 6,408,005 B1 | * | 6/2002 | Fan et al. | 370/412 |
| 6,466,939 B1 | * | 10/2002 | Lai et al. | 707/101 |
| 6,483,841 B1 | * | 11/2002 | Chang et al. | 370/412 |
| 6,510,531 B1 | * | 1/2003 | Gibbons | 714/37 |
| 2002/0039370 A1 | * | 4/2002 | Elliot | 370/503 |

OTHER PUBLICATIONS

Scott Rixner et al., "Memory Access Scheduling," Proceedings of the 27th Annual International Symposium on Computer Architecture, ACM Press, New York, NY, 2000, pp. 128–138.

* cited by examiner

*Primary Examiner*—Donald Sparks
*Assistant Examiner*—Christian P. Chace
(74) *Attorney, Agent, or Firm*—The Law Office of Kirk D. Williams

(57) ABSTRACT

Methods and apparatus are disclosed for reading from and writing to storage using acknowledged phases of sets of data. In one implementation, a phase indication is maintained. A first value of the phase indication is associated with a first plurality of memory requests, and a second value of the phase indication is associated with a second plurality of memory requests. The first and second pluralities of memory requests are forwarded to a memory control component. A first acknowledgement that the first plurality of memory requests have been manipulated is received, which allows a next set of data to be sent using the acknowledged phase. In one implementation, the plurality of memory requests include a write request. In one implementation, the plurality of memory requests include a read request.

41 Claims, 18 Drawing Sheets

US 6,715,046 B1

METHOD AND APPARATUS FOR READING FROM AND WRITING TO STORAGE USING ACKNOWLEDGED PHASES OF SETS OF DATA

FIELD OF THE INVENTION

This invention especially relates to writing to and reading from storage, such as that used in communications and computer systems; and more particularly, the invention relates to reading from and writing to storage, including, but not limited to memory devices, using acknowledged phases of sets of data.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet. For example, a enqueuing component of such a device receives a stream of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are maintained in separate memory. A memory interface typically dictates the amount of information written into memory each clock cycle, and typically a packet, especially a large packet, is written to memory over multiple clock cycles. Once the entire packet is written into memory, the packet becomes eligible for processing, and an indicator of the packet is typically placed in an appropriate destination queue for being serviced according to some scheduling algorithm.

The dequeue machine operates in parallel, running an scheduling algorithm to determine which packet should be read from the memory into an output buffer. Once the entire data is read into the output buffer, the packet can be forwarded to a next component or system, and the buffer space it occupied is freed for other packets.

As packets are received at higher rates, then these operations must also be performed at higher rates. The nature of the system and of the large fast memories, which exist in today's market, introduces a problem of ordering in memory accessing. The order of the actual memory accesses is very hard to predict due to various reasons, including the varying nature of traffic and the burstiness behavior of both read and write side, especially as the number of read and write accesses varies.

The characteristics of the external memories imply that for achieving maximum efficiency, most of the memory accesses have to be reordered to avoid conflicts. This means that the order in which they were issued by the enqueue machine to the memory interface is not necessarily the order in which they are actually written to the memory. Switches from read to write and vice versa, should be as infrequent as possible, because switching also causes a penalty in the number of memory accesses. This means that the memory interface should attempt executing as many writes as it can before switching to read and vice versa, and this fact further weakens the correlation between the order of issuing a memory access, and the order of execution. As a result of these and other factors, complex processing must be performed to determine when an entire packet data is actually written to memory and is thus eligible for being enqueued to the appropriate target queue. Similar processing must be performed to determine when the entire packet's data is read, and the memory space can be freed.

New methods and apparatus are needed for efficiently determining when the data of an entire packet is read from or written to storage.

SUMMARY OF THE INVENTION

Methods and apparatus are disclosed for reading from and writing to storage, including, but not limited to memory devices, using acknowledged phases of sets of data. In one embodiment, a phase indication is maintained. A first value of the phase indication is associated with a first plurality of storage requests, and a second value of the phase indication is associated with a second plurality of storage requests. The first and second pluralities of storage requests are forwarded to a storage control component. A first acknowledgement that the first plurality of storage requests have been manipulated is received. In one embodiment, the plurality of storage requests include a write request. In one embodiment, the plurality of storage requests include a read request.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
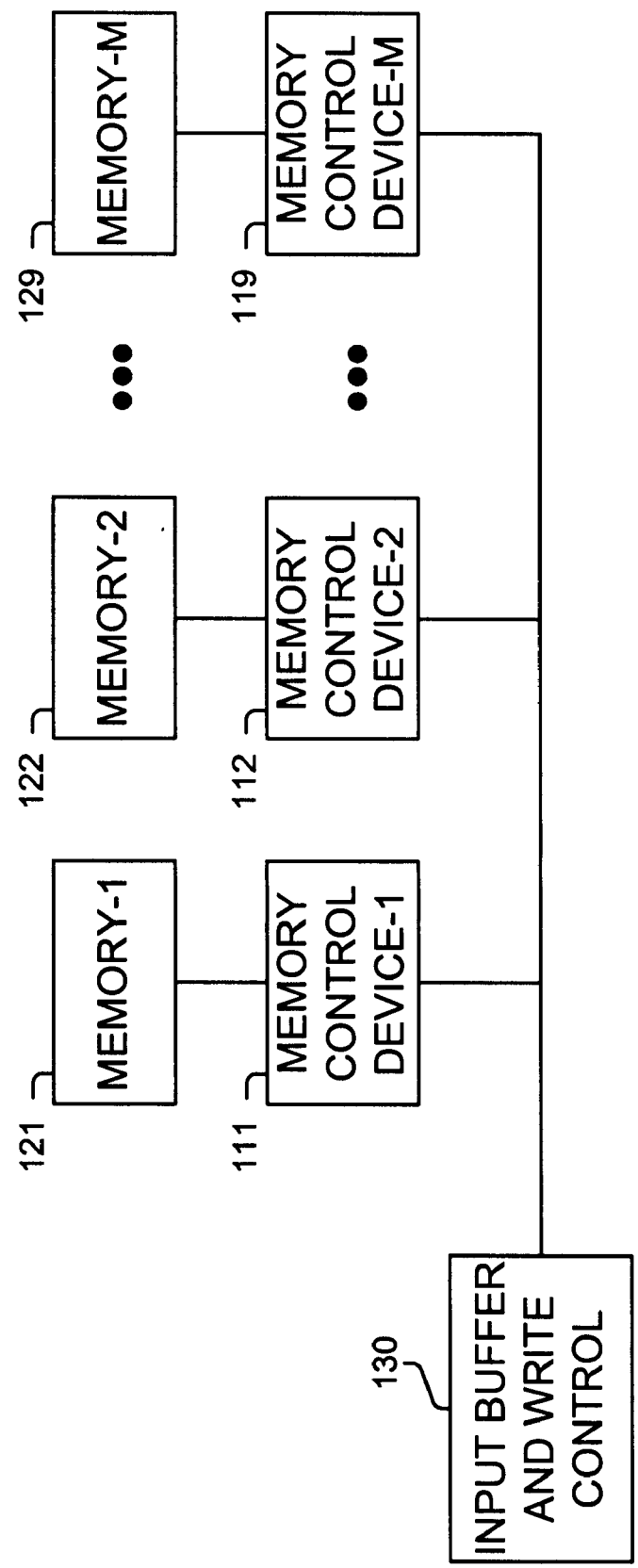
FIG. 1A is a block diagram of an embodiment for writing to storage using acknowledged phases of sets of data.

Methods and apparatus are disclosed for reading from and writing to storage, including, but not limited to memory devices, using acknowledged phases of sets of data. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps and processing of signals and information illustrated in the figures are typically be performed in a different serial or parallel ordering and/or by different components in various embodiments in keeping within the scope and spirit of the invention. Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information. The term "subset" is used to indicate a group of all, less than all, or none of the elements of a set. Moreover, the term "or" is used herein to identify an alternative selection of one or more, including all, of the conjunctive items.

Methods and apparatus are disclosed for reading from and writing to storage using acknowledged phases of sets of data. In one embodiment, a phase indication is maintained. A first value of the phase indication is associated with a first plurality of memory requests, and a second value of the phase indication is associated with a second plurality of memory requests. The first and second pluralities of memory requests are forwarded to a memory control component. A first acknowledgement that the first plurality of memory requests have been manipulated is received. In one embodiment, the plurality of memory requests include a write request. In one embodiment, the plurality of memory requests include a read request.

In one embodiment, accesses to storage (e.g., memory for storing data of packets) are performed in segments or sets of data. Each predefined set of write accesses from enqueue machine to a storage interface is attributed with a same phase indicator, with no outstanding two sets of data having the same phase indicator. The number of phases used depends on the embodiment, and may include one, two, three, four, or more phases. These phases have an ordering attribute so the earlier phases can be distinguished from later phases. In this manner, the phase attribute of a set of data can be used to determine its relative age, and also be given priority over data sets with a younger phase. In one embodiment, the storage interface efficiently reads and writes data items to storage, which includes reading and writing data items in a different order than received. The storage interface may also consider the phase and its age in determining the order in which to read and/or write data items.

When all data items of a particular phase have been written or read, then a phase acknowledgement is provided to the component generating the corresponding write or read requests. In one embodiment, a same number of data items are tagged with a phase indication, and thus a phase counter can be used to readily determine when all data items belonging to a phase have been written or read. Moreover, determining when a packet has been completely read or written is readily accomplished by maintaining the youngest phase of a data item belonging to a particular packet and matching with the phase acknowledgements.

The phase acknowledgments not necessarily arrive in order (e.g., the acknowledgment for a second phase may arrive before the acknowledgment for a first phase). In one embodiment the acknowledgment for the younger phase is ignored until the acknowledgment for the older phase has arrived. In one embodiment the acknowledgment for the younger phase is immediately used for retiring the appropriate request, and the order of phases is changed.

In one embodiment, a dedicated counter per each packet whose data is in the process of being written to or read from storage or a storage interface is maintained. Each counter is initialized to the packet length, and decrements each time a signal from the storage interface indicates that a portion of the packet has been written to or read from the storage or the request is being processed by the storage interface. When a counter reaches zero, the entire packet has been written to or read from storage. In one embodiment, data elements comprising a particular packet are written to storage over multiple write phases and/or read from storage over multiple read phases. In one embodiment, data elements comprising a particular packet are written to storage over a single write phase and/or read from storage over a single read phase.

FIG. 1A illustrates one embodiment for writing to storage using acknowledged phases of sets of data. Packets or other data are received in input buffer and write control 130. A packet is typically divided into multiple sets of data items, each associated with a single phase. The data items belonging to a phase are typically distributed to one or more memory control devices 111–119 for writing the packets to one or more memories 121–129. In one embodiment, data items identified with different phases are sent from input buffer and write control 130 to one or more memory control devices 111–119 prior to a receipt of an acknowledgement of an earlier phase. In one embodiment, input buffer and write control 130 awaits receipt of an acknowledgement of a particular phase from each of the one or more memory control devices 111–119 before considering the phase as being acknowledged.

Figure 1B:
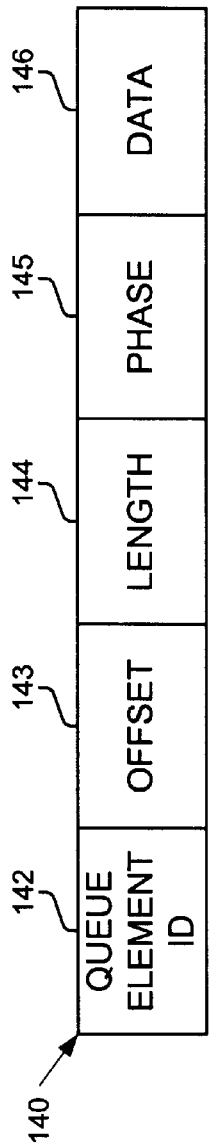
FIG. 1B is a data element used in one embodiment for writing to storage using acknowledged phases of sets of data.

FIG. 1B illustrates one embodiment of a data item 140 (e.g., a write request) sent from input buffer and write control 130 to one or more memory control devices 111–119. As illustrated, data item 140 includes a queue element identifier 142, an offset 143, a length 144, a phase 145, and data 146. In one embodiment, queue element identifier 142, offset 143, and length 144 are used by one or more memory control devices 111–119 to calculate the address in one or more memories 121–129 to actually store the data 146.

Figure 1C:
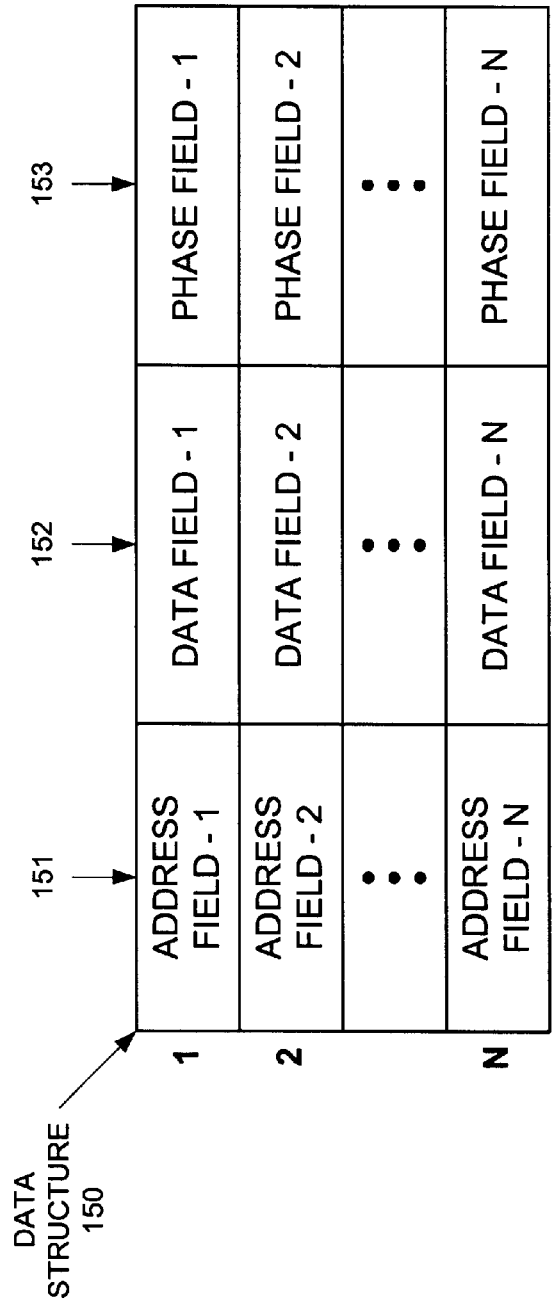
FIGS. 1C–D are data structures used in one embodiment for writing to storage using acknowledged phases of sets of data.

FIG. 1C illustrates a data structure 150 used in one embodiment by one or more memory control devices 111–119 (FIG. 1A) to buffer or queue items to be written to memory. Data structure 150 includes N entries, each typically with some value stored in an address field 151, a data field 152, and a phase field 153. Typically, an entry includes the address (in address field 151) in one or more memories 121–129 (FIG. 1A) to store a data item (in data field 152) and its corresponding phase (in phase field 153).

Figure 1D:
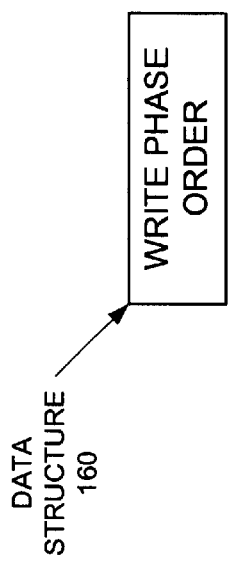

FIG. 1D illustrates a data structure 160 used in one embodiment to maintain an ordered set of write phases and an indication which write phases are currently in use and those available. In one embodiment, the relative age of each of the write phases, including the oldest write phase, can be readily be determined from data structure 160. In one embodiment, data structure 160 includes one or more linked lists, counters, variables, bitmaps, or other data structure elements.

Figure 2A:
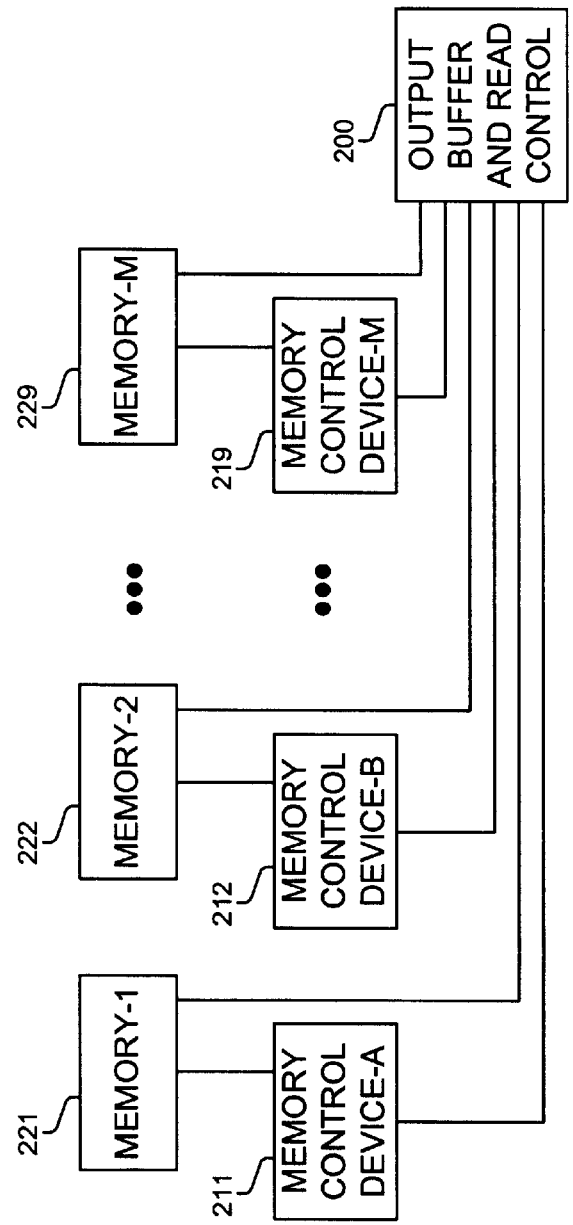
FIG. 2A is a block diagram of an embodiment for reading from storage using acknowledged phases of sets of data.

FIG. 2A illustrates one embodiment for reading from storage using acknowledged phases of sets of data. Data read requests are generated by output buffer and read control 200 and forwarded to one or more memory control devices 211–219 for retrieving the corresponding data from one or more memories 221–229. In one embodiment, data read requests identified with different phases are sent from output buffer and read control 200 to one or more memory control devices 211–219 prior to a receipt of an acknowledgement of an earlier phase. In one embodiment, output buffer and write control 200 awaits receipt of an acknowledgement of a particular phase from each of the one or more memory control devices 211–219 before considering the phase as being acknowledged.

Figure 2B:
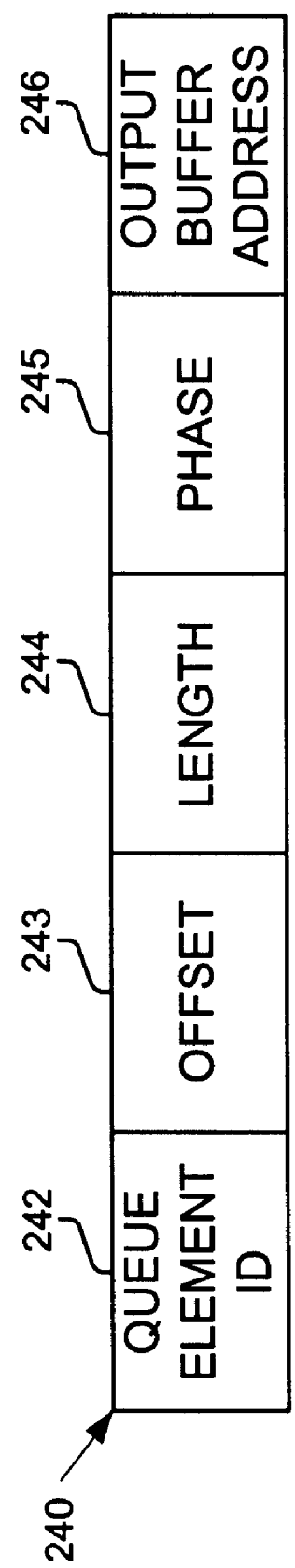
FIG. 2B is a data element used in one embodiment for reading from storage using acknowledged phases of sets of data.

FIG. 2B illustrates one embodiment of a read request 240 sent from output buffer and write control 200 to one or more memory control devices 211–219. As illustrated, read request 240 includes a queue element identifier 242, an offset 243, a length 244, a phase 245, and an output buffer address 246. In one embodiment, queue element identifier 242, offset 243, and length 244 are used by one or more memory control devices 211–219 to calculate the address in one or more memories 121–129 to actually read the corresponding data, which is then stored in an output buffer within output buffer and read control 200 based on the identified output buffer address 246.

Figure 2C:
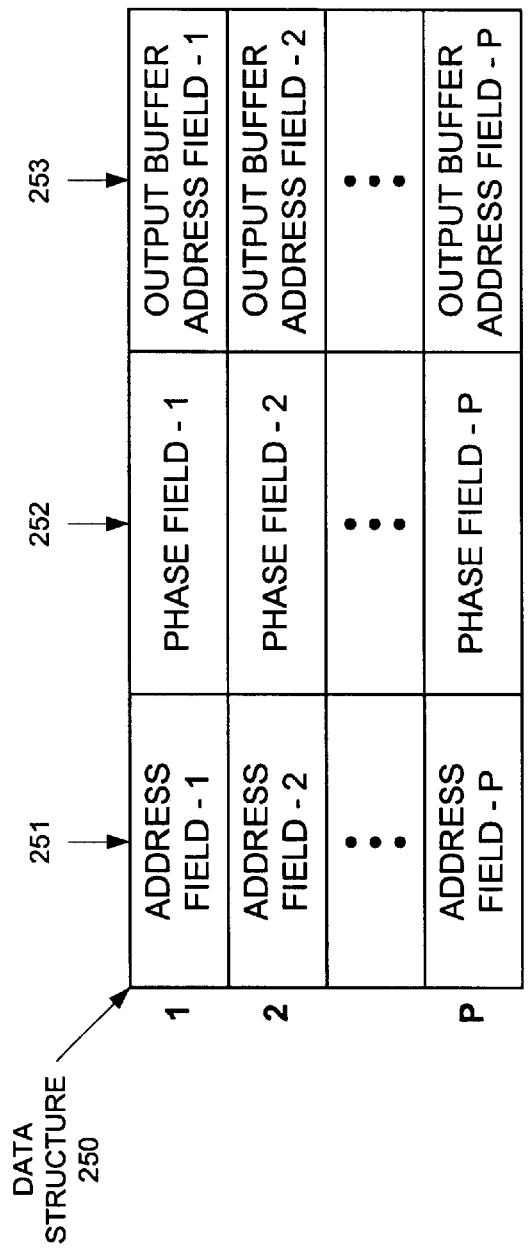
FIGS. 2C–D are data structures used in one embodiment for reading from storage using acknowledged phases of sets of data.

FIG. 2C illustrates a data structure 250 used in one embodiment by one or more memory control devices 211–219 (FIG. 2A) to buffer or queue memory read requests. Data structure 250 includes P entries, each typically with some value stored in an address field 251, a phase field 252, and an output buffer address field 253. Typically, an entry includes the address (in address field 251) in one or more memories 221–219 (FIG. 2A) from which to read a data item, a corresponding phase (in phase field 252) of the read request, and a output buffer (in output buffer address field 253) in which to place the read data item.

Figure 2D:
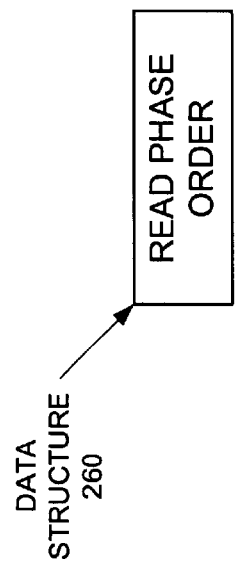

FIG. 2D illustrates a data structure 260 used in one embodiment to maintain an ordered set of read phases and an indication which read phases are currently in use and those available. In one embodiment, the relative age of each of the read phases, including the oldest read phase, can be readily be determined from data structure 260. In one embodiment, data structure 260 includes one or more linked lists, counters, variables, bitmaps, or other data structure elements.

Figure 3A:
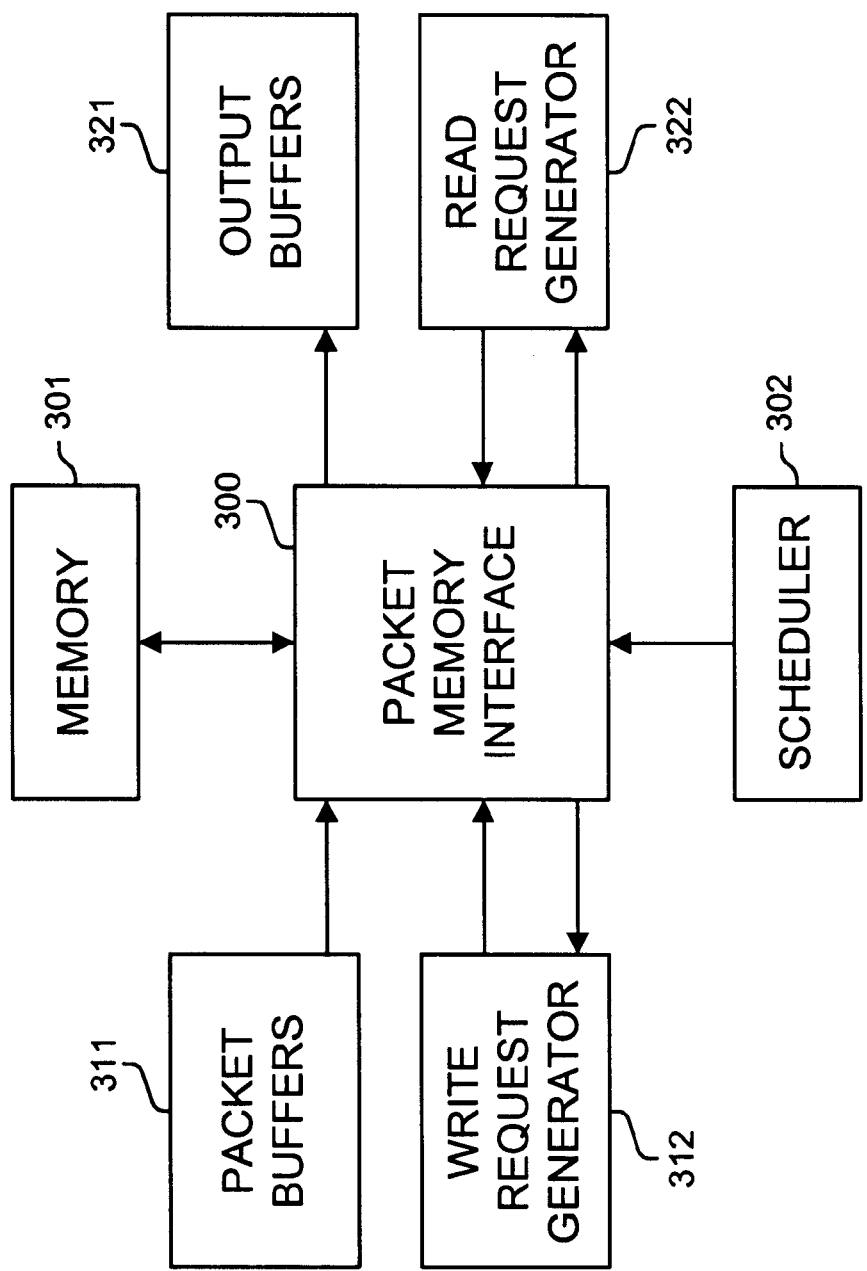
FIG. 3A is a block diagram of an embodiment illustrating a packet memory interface component for reading from and writing to storage using acknowledged phases of sets of data.

FIG. 3A illustrates one embodiment of a system for reading from and writing to storage using acknowledged phases of sets of data. Write request generator 312 generates sets of phased write requests and forwards them to packet memory interface 300, which processes the write requests to efficiently write packet data from packet buffers 311 to memory 301. Additionally, read request generator 322 generates sets of phased read requests and forwards them to packet memory interface 300, which processes the read requests to efficiently read packet data from memory 301, and this read data is placed in output buffers 321. Scheduler 302 is used to efficiently control the reading from and writing to memory 301 by packet memory interface 300.

Figure 3B:
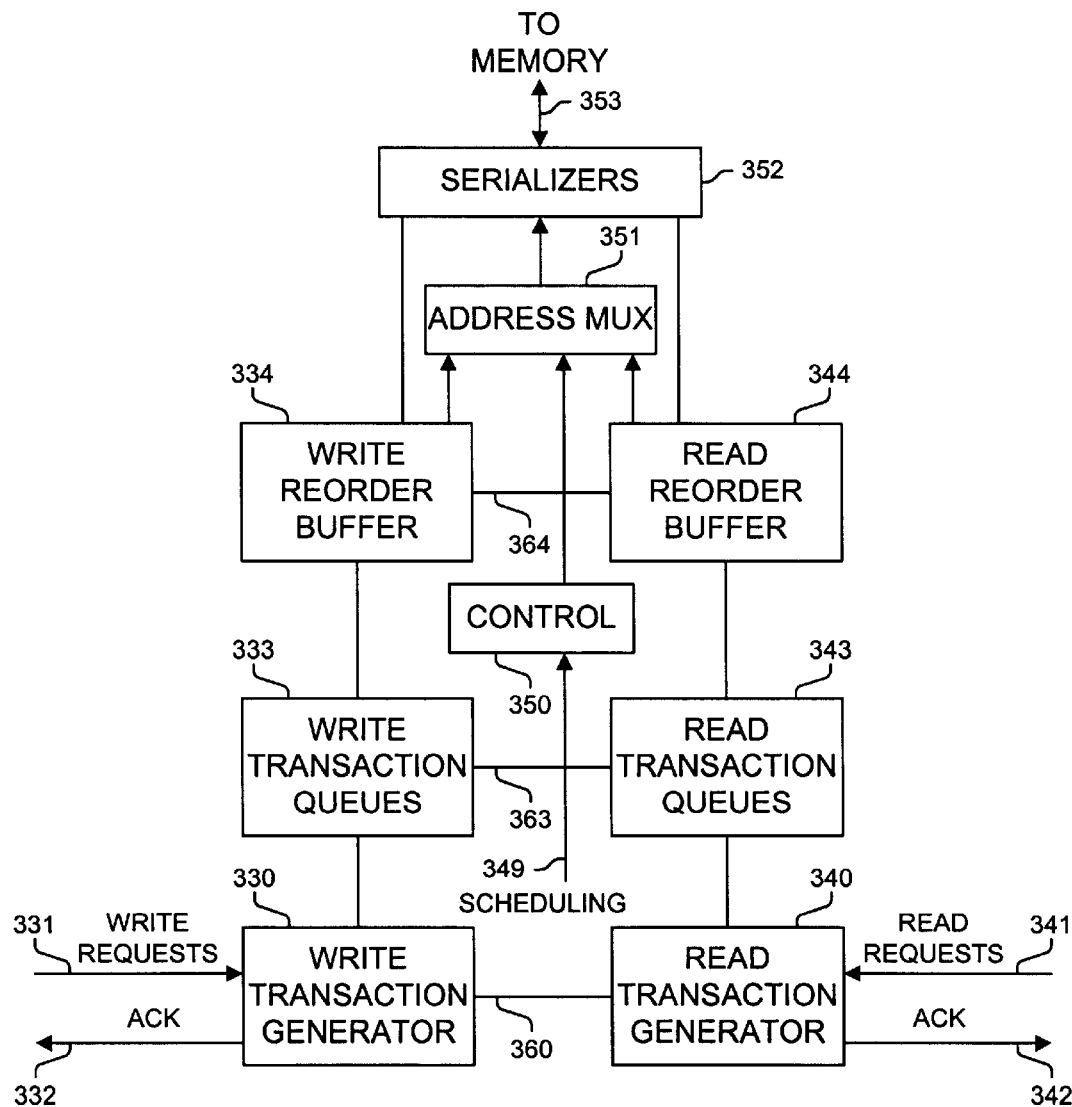
FIG. 3B is a block diagram of an exemplary packet memory interface used in one embodiment.

FIG. 3B illustrates one embodiment of a packet memory interface 300. As shown, control 350, typically based at least in part on received scheduling signals 349, controls the reading and writing operations to the external memory, which includes controlling address multiplexer 351. As shown, write requests 331 are received by write transaction generator 330, which populates write transaction queues 333 with write requests. Write reorder buffer 334 determines the actual order to write the requests to an external memory (or other storage) and provides the appropriate data and address to serial interface 352 for generating signals 353 for writing to one or more external memory or other storage components.

In one embodiment, a write phase acknowledgement signal 332 is generated for a particular phase when the last item belonging to the phase is written to memory. In one embodiment, a write phase acknowledgement signal 332 is generated for a particular phase when the last item belonging to the phase exits write transaction generator 330. In one embodiment, a write phase acknowledgement signal 332 is generated for a particular phase when the last item belonging to the phase is placed in or exits write transaction queues 333 or write reorder buffer 334, in which case, the data items may not be actually stored in memory and these data items and/or control information may be exchanged over links 360–364 with corresponding read components 340–344. In one embodiment, a write phase acknowledgement signal 332 is generated for a particular phase when the last item belonging to the phase exits write transaction generator 330, is placed in or exits write transaction queues 333 or write reorder buffer 334, in which case, the time required for the data items to be stored in memory is known or bounded, which can be used in determining when a data item stored in memory is available to be read from memory (or other storage device).

As shown, read requests 341 are received by read transaction generator 340, which populates read transaction queues 343 with read requests. Read reorder buffer 344 determines the actual order to read the data from an external memory and provides the appropriate address to serial interface 352 for generating signals 353 for reading from an external memory component. A read phase acknowledgement signal 342 is generated for a particular phase when the last item belonging to the phase is actually read from memory, or a corresponding read request is placed in or exits read transaction queues 343 or write reorder buffer 344.

Figure 4:
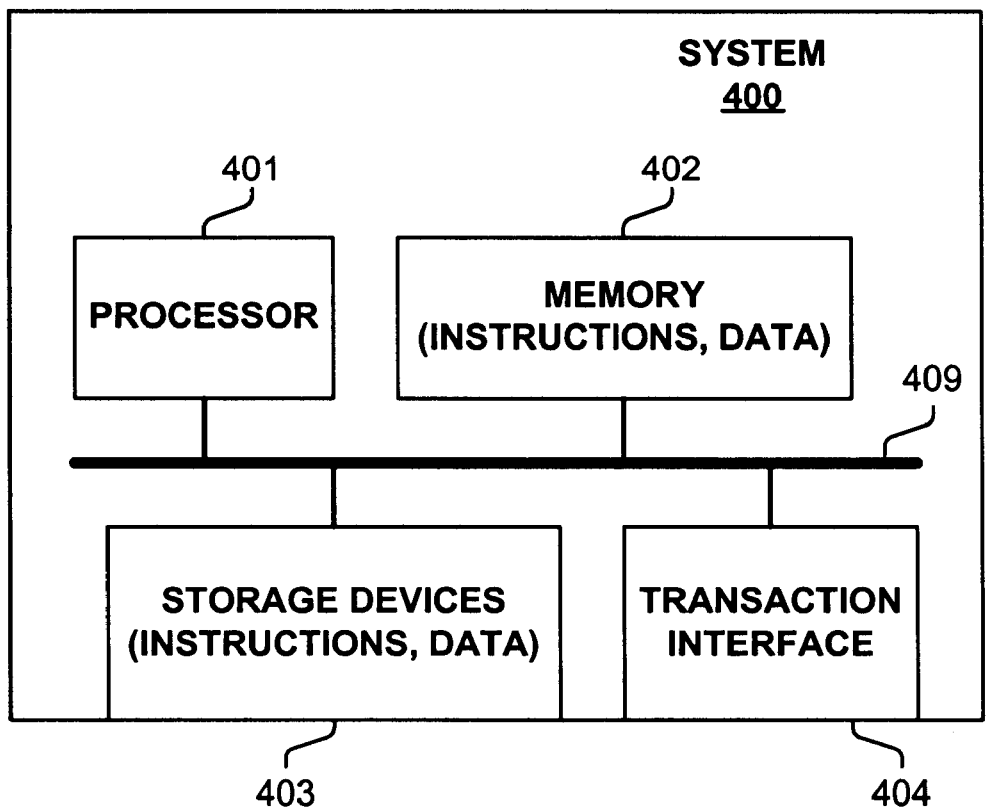
FIG. 4 is a block diagram of a system used in one embodiment for generating memory requests, and additionally in one embodiment providing the destination storage.

FIG. 4 illustrates one embodiment of a system 400 for reading from and/or writing to storage using acknowledged phases of sets of data. In one embodiment, system 400 generates read and/or write requests and provides these via transaction interface 404 to an external system, and receives phase acknowledgements via transaction interface 404. In one embodiment, system 400 receives read and/or write requests via transaction interface 404, performs the memory/storage accesses, and transmits phase acknowledgements over transaction interface 404. In one embodiment, system 400 generates read and/or write transactions, performs the memory/storage accesses, and generates phase acknowledgements.

In one embodiment, system 400 includes a processor 401, memory 402, storage devices 403, and a transaction interface 404, which are electrically coupled via one or more communications mechanisms 409 (shown as a bus for illustrative purposes). Various embodiments of system 400 may include more or less elements. The operation of system 400 is typically controlled by processor 401 using memory 402 and storage devices 403 to perform one or more tasks or processes. Memory 402 is one type of computer-readable medium, and typically comprises random access memory (RAM), read only memory (ROM), flash memory, integrated circuits, and/or other memory components. Memory 402 typically stores computer-executable instructions to be executed by processor 401 and/or data which is manipulated by processor 401 for implementing functionality in accordance with the invention. Storage devices 403 are another type of computer-readable medium, and typically comprise solid state storage media, disk drives, diskettes, networked services, tape drives, and other storage devices. Storage devices 403 typically store computer-executable instructions to be executed by processor 401 and/or data which is manipulated by processor 401 for implementing functionality in accordance with the invention.

As used herein and contemplated by the invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 5A:
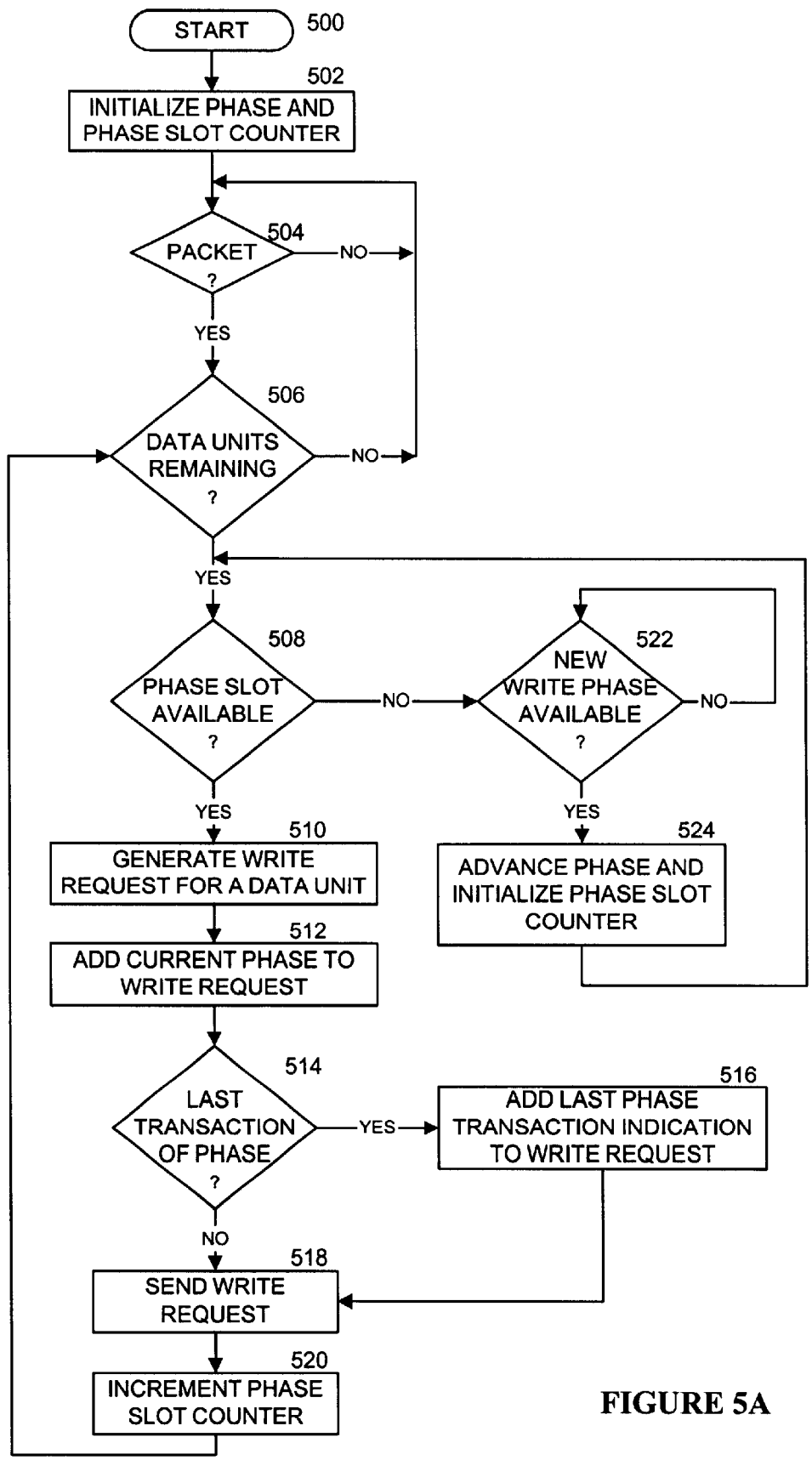
FIGS. 5A–E are flow diagrams of exemplary processes used in one embodiment for writing to storage using acknowledged phases of sets of data.

FIG. 5A illustrates a process used in one embodiment for generating phased sets of write requests. Processing begins with process block 500, and proceeds to process block 502, wherein a current phase and phase slot counter are initialized. Next, as determined in process block 504, if there is a packet to be written to memory or any other storage mechanism, then processing proceeds to process block 506. If there are units of data remaining to be written, then processing proceeds to process block 508. If there is a phase slot remaining in the current phase, then, in process blocks 510–512, a write request is generated for the next remaining data unit and the current phase is included in the write request. If, as determined in process block 514, the generated write request corresponds to a last one of the current phase, then in process block 516, a last transaction indication is added to the write request. In process blocks 518–520, the write request is sent, and the phase slot counter is incremented. Processing then returns to process block 506. When, as determined in process block 508, there are no more slots available in the current phase, then, as determined in process block 522, when a new phase is or becomes available, the current phase is advanced and the phase slot counter is initialized in process block 524, and processing returns to process block 508. Note, in one embodiment the ordering of write phases is static; while in one embodiment, the ordering of phases is dynamic, such as when a phase becomes available based on the optimized order that units are actually processed and/or written to storage.

Figure 5B:
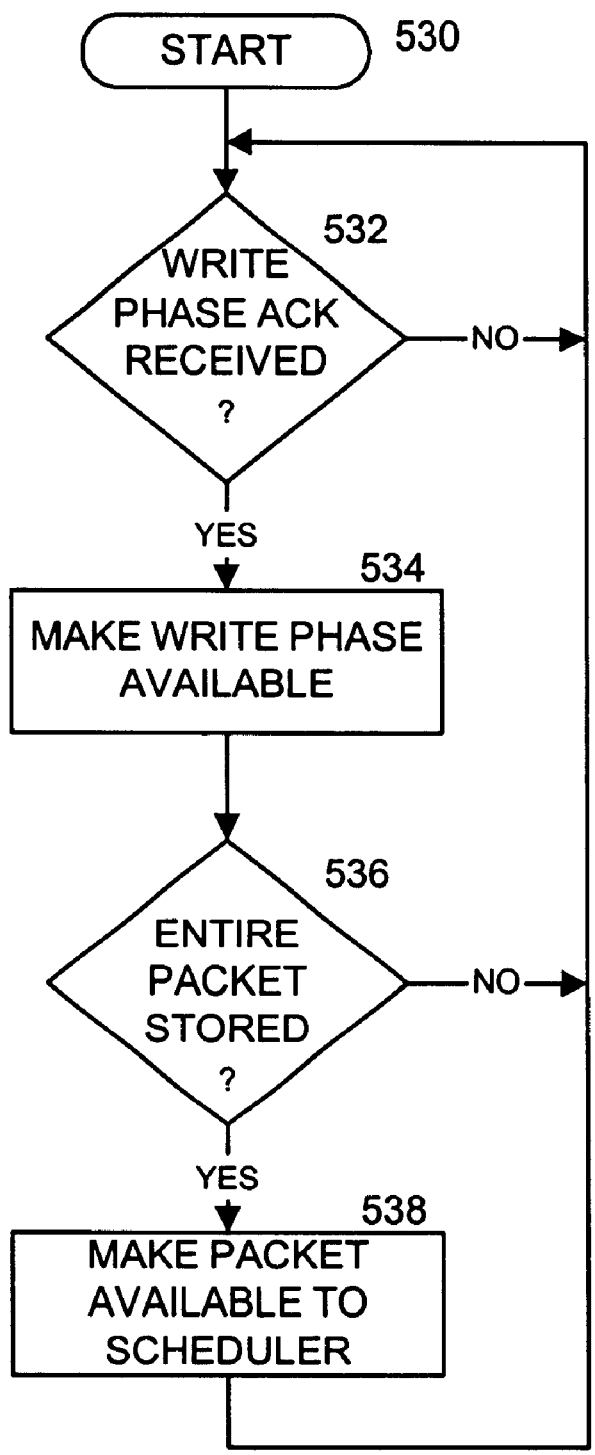

FIG. 5B illustrates a process used in one embodiment for receiving and processing phase acknowledgements for write requests. Processing beings with process block 530, and proceeds to process block 532. If a write phase acknowledgement is received, processing proceeds to process block 534, wherein the particular write phase is made available for use for another set of write requests. Next, as determined in process block 536, if the entire packet corresponding to the received acknowledgement was stored (e.g., the write acknowledgement corresponds to the latest acknowledgement of a data item of the packet), then the packet is made available to a scheduler in process block 538, and processing returns to process block 532.

Figure 5C:
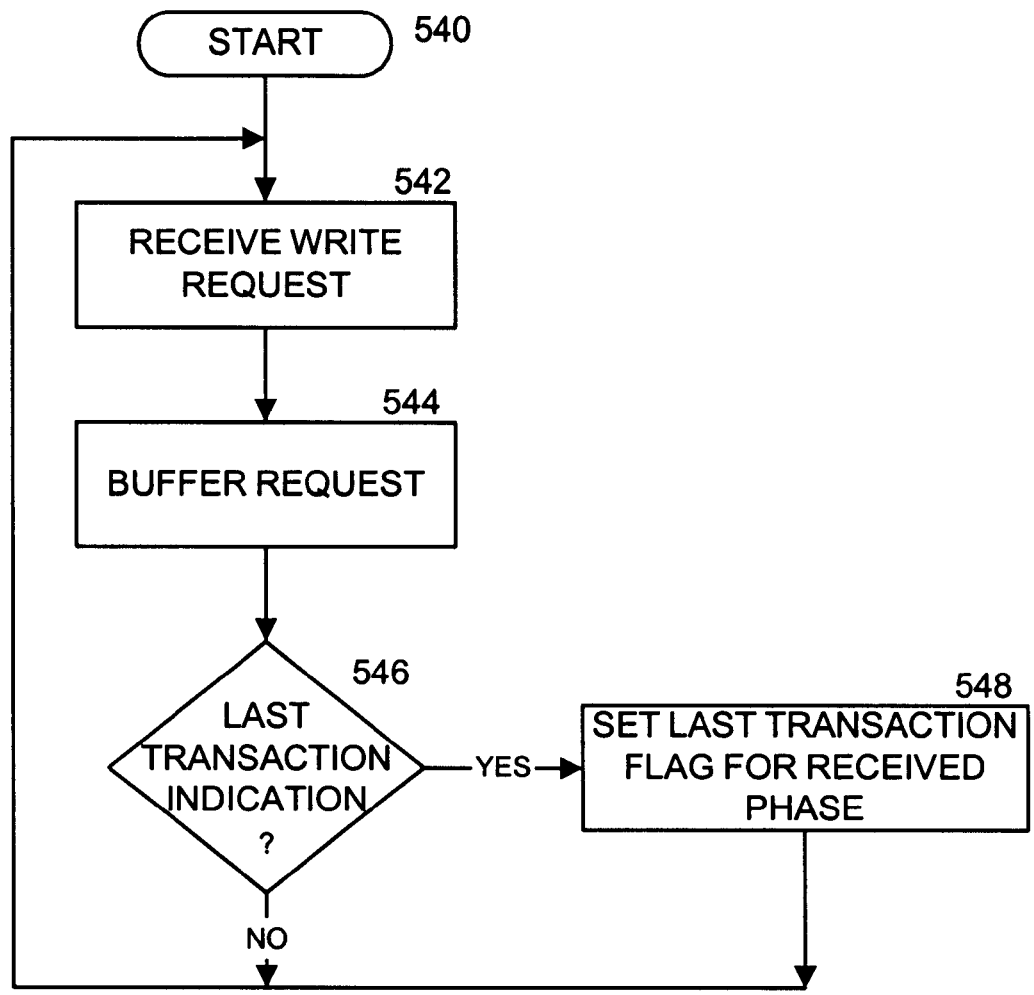
Figure 5D:
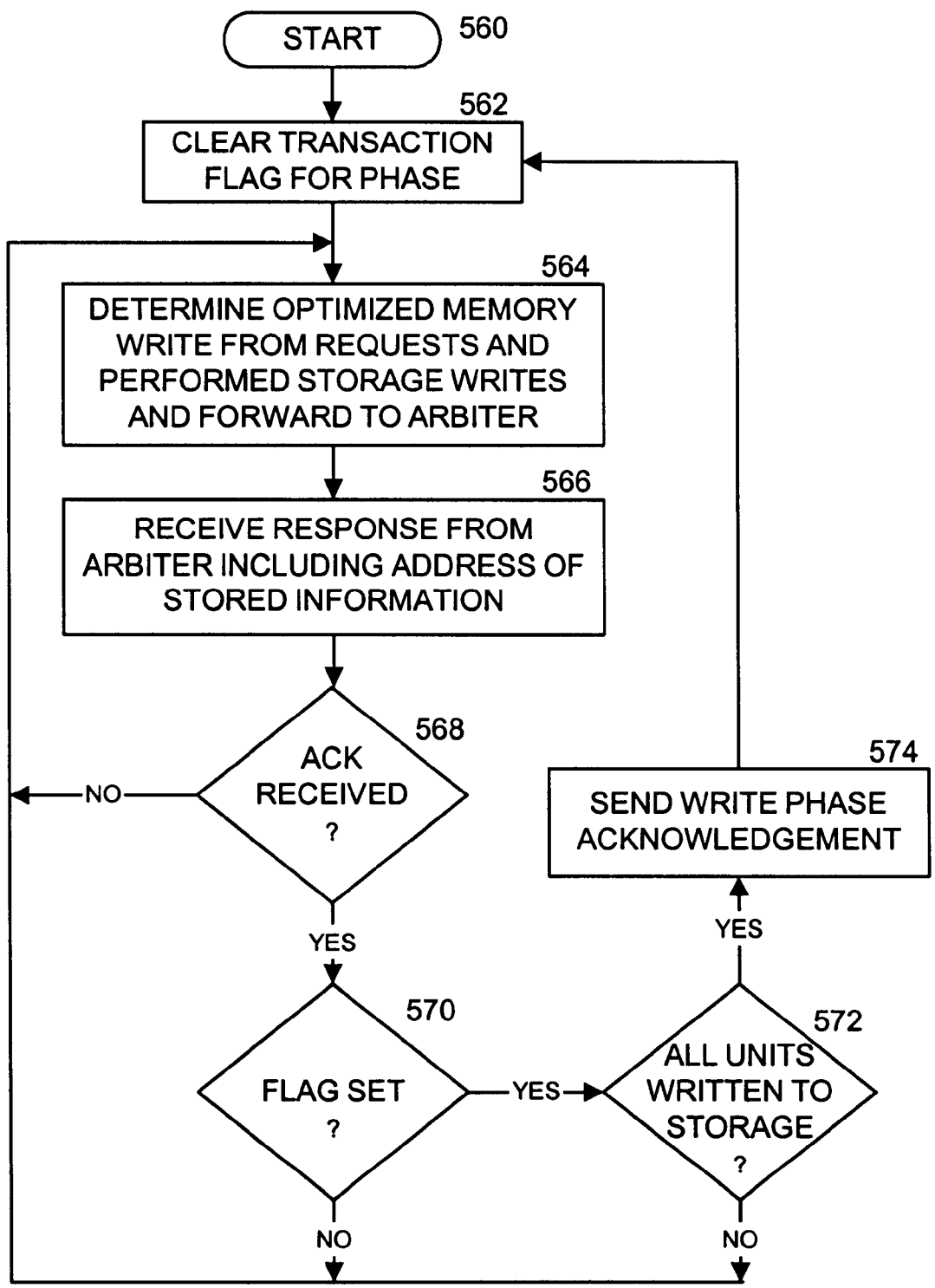

FIGS. 5C–D illustrate processes used in one embodiment of a write request machine for receiving and processing write requests. In one embodiment, there is a separate set of processes illustrated in FIGS. 5C–D for each phase, while in one embodiment, there is one set of processes handling all phases. In one embodiment, a single process illustrated in FIG. 5C is used along with multiple instances of the process illustrated in FIG. 5D, such as one for each write phase.

FIG. 5C illustrates a process used in one embodiment for receiving write requests. Processing begins with process block 540, and proceeds to process block 542, wherein a write request is received. In process block 544, the write request is buffered. Next, as determined in process block 546, if the write request includes a set last transaction indication, then a flag is set in process block 548 indicating the received write request corresponds to a last one of the received phase. Processing returns to process block 542.

FIG. 5D illustrates a process used in one embodiment for processing write requests. Processing begins with process block 560, and proceeds to process block 562, wherein the phase transaction flag is cleared. In one embodiment, there is a single phase transaction flag, while in one embodiment handling all phases, there are multiple transaction flags, typically each corresponding to a different phase. Next, in process block 564, an optimized memory write is determined from received requests and previously performed storage write operations, and these one or more memory write requests are sent to a write arbiter, such as that illustrated in FIG. 5E. In process block 566, a response is received from the arbiter after it performs one or more storage write operations from one of the phases. Typically, the response includes an indication of the address of the stored information and from which phase or which write request generator generated the stored request.

If, as determined in process block 568, an acknowledgement indication is received that the arbiter did not store a generated write request by the particular write request generator, then processing returns to process block 564. Otherwise, if, as determined in process block 570, the transaction flag for the current phase is not set, then processing returns to process block 564. Otherwise, if, determined in process block 572, that all the units of the current phase have not been actually written to storage, then processing returns to process block 564. Otherwise, in process block 574, a write phase acknowledgement is sent to the write request generator, such as that illustrated in FIGS. 5A–B. Note, in one embodiment, the write phase acknowledgement is sent prior to the units actually being written to storage. Processing then returns to process block 562.

Figure 5E:
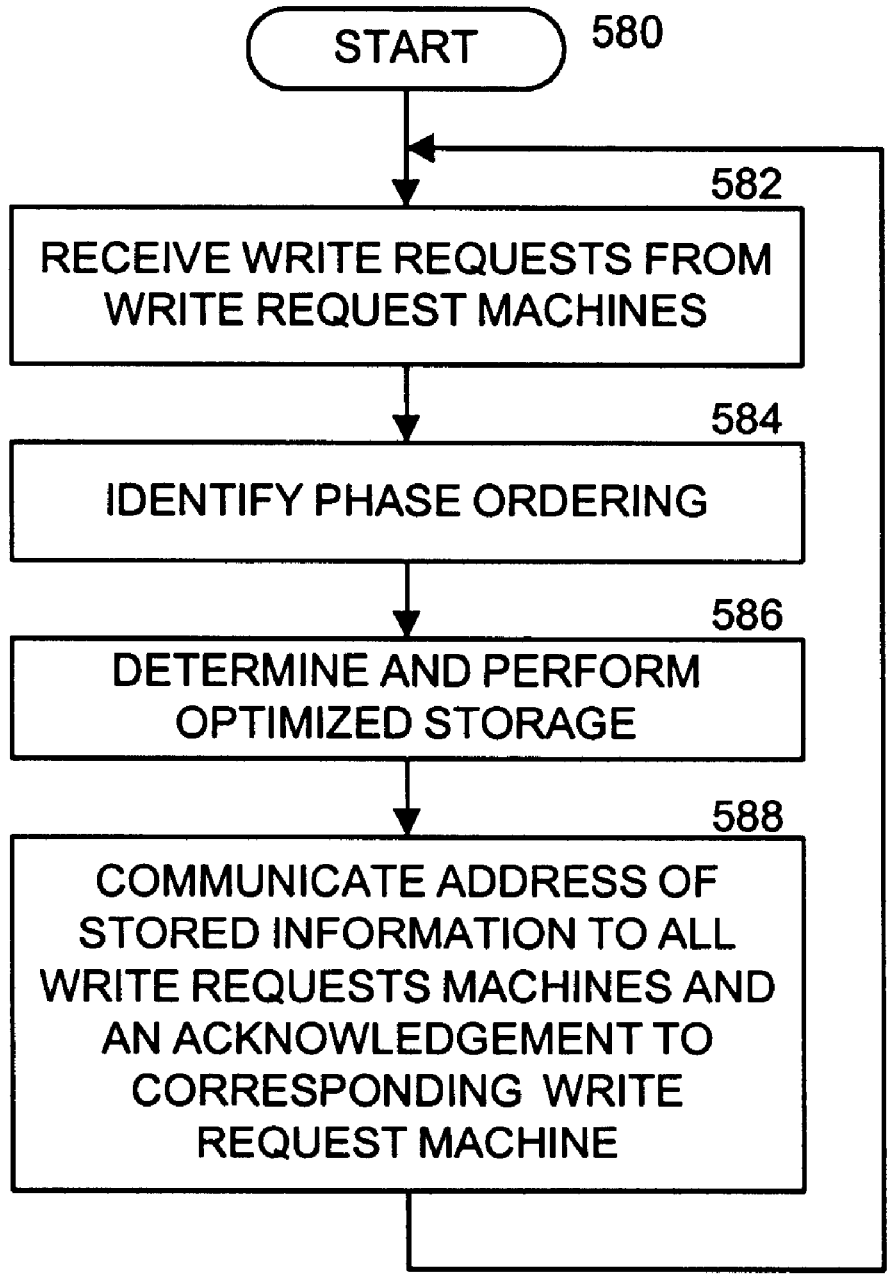

FIG. 5E illustrates a process used in one embodiment of an arbiter for receiving write requests from multiple phases and for storing the data associated with the write requests to memory or other storage. Processing begins with process block 580, and proceeds to process block 582, wherein a write request is received from each of the one or more write request machines. In process block 584, the ordering (e.g., the relative age) of the phases is identified, such as by referencing a data structure, such as data structure 160 illustrated in FIG. 1D. In process block 586, an optimized memory write is determined and performed from all buffered write requests, with preference to the earliest write phase. Next, in process block 588, each of the write request generators are provided the address of the stored information for use in generating a preferred next write request, as well as an acknowledgement indication to the write request machine (or machines in one embodiment) which generated the performed write request. Processing returns to process block 582.

Figure 6A:
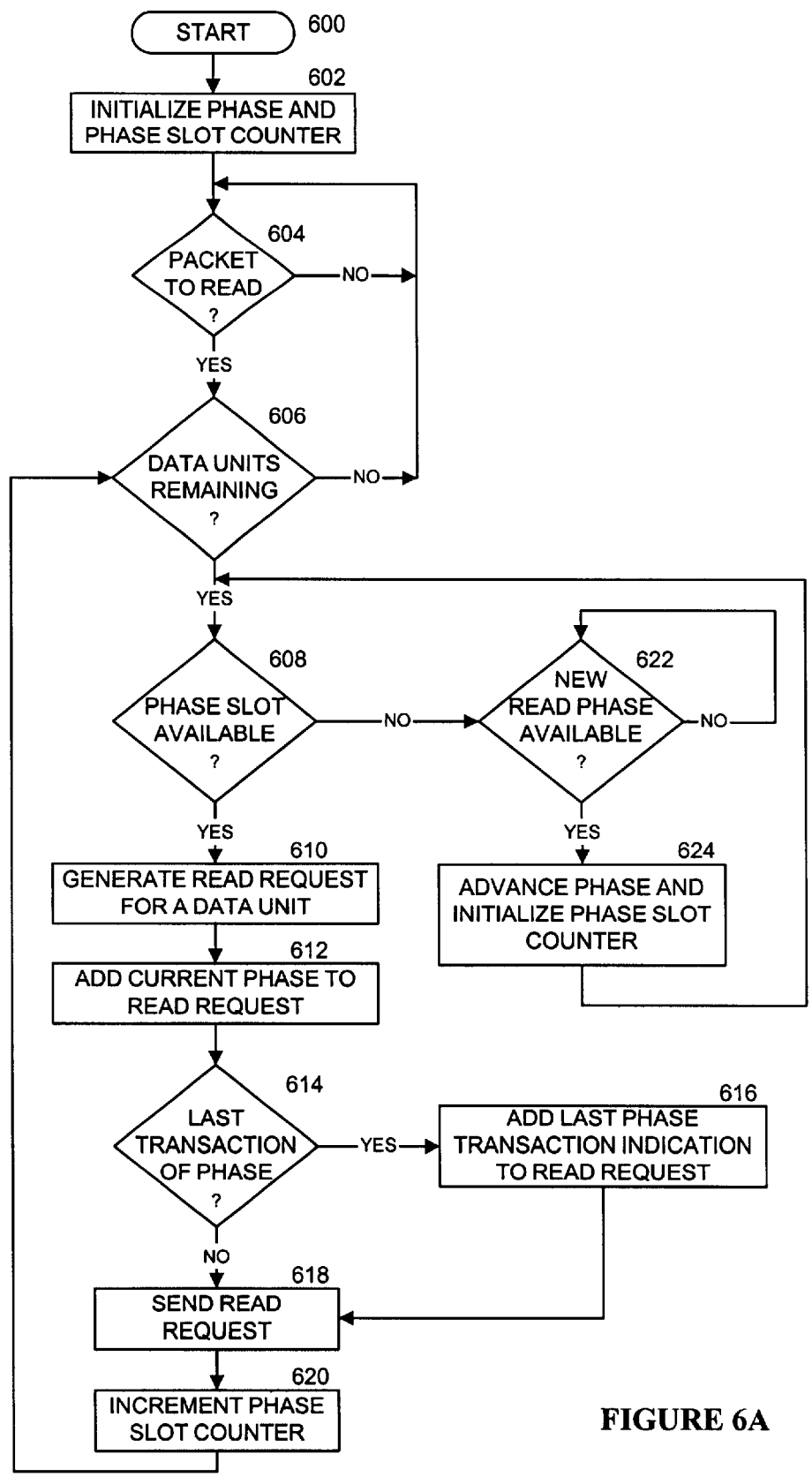
FIGS. 6A–E are flow diagrams of exemplary processes used in one embodiment for reading from storage using acknowledged phases of sets of data.

FIG. 6A illustrates a process used in one embodiment for generating phased sets of read requests. Processing begins with process block 600, and proceeds to process block 602, wherein a current phase and phase slot counter are initialized. Next, as determined in process block 604, if there is a packet to be read from memory or any other storage mechanism, then processing proceeds to process block 606. If there are units of data remaining to be read, then processing proceeds to process block 608. If there is a phase slot remaining in the current phase, then, in process blocks 610–612, a read request is generated for the next remaining data unit and the current phase is included in the read request. If, as determined in process block 614, the read request corresponds to a last one of a given phase, then in process block 616, a last phase transaction indication is added to the read request in process block 616. Next, in process blocks 618–620, the read request is sent, and the phase slot counter is incremented. Processing then returns to process block 606. When, as determined in process block 608, there are no more slots available in the current phase, then, as determined in process block 622, when a new phase is or becomes available, the current phase is advanced and the phase slot counter is initialized in process block 624, and processing returns to process block 608. Note, in one embodiment the ordering of read phases is static; while in one embodiment, the ordering of phases is dynamic, such as when a phase becomes available based on the optimized order that units are actually processed and/or read from storage.

Figure 6B:
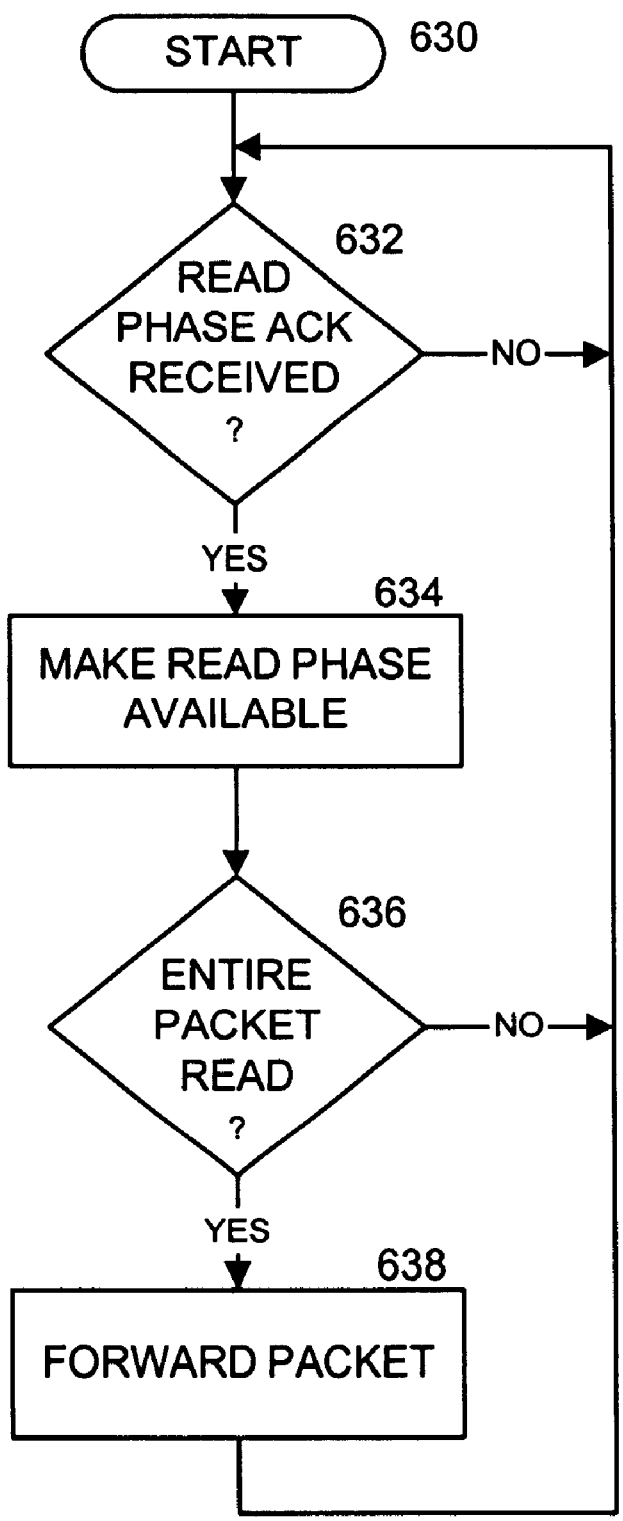

FIG. 6B illustrates a process used in one embodiment for receiving and processing phase acknowledgements for read requests. Processing beings with process block 630, and proceeds to process block 632. If a read phase acknowledgement is received, processing proceeds to process block 634, wherein the particular read phase is made available for use for another set of read requests. Next, as determined in process block 636, if the entire packet corresponding to the received acknowledgement was read (e.g., the read acknowledgement corresponds to the latest acknowledgement of a data item of the packet), then the packet is forwarded or processed in another manner in process block 638, and processing returns to process block 632.

Figure 6C:
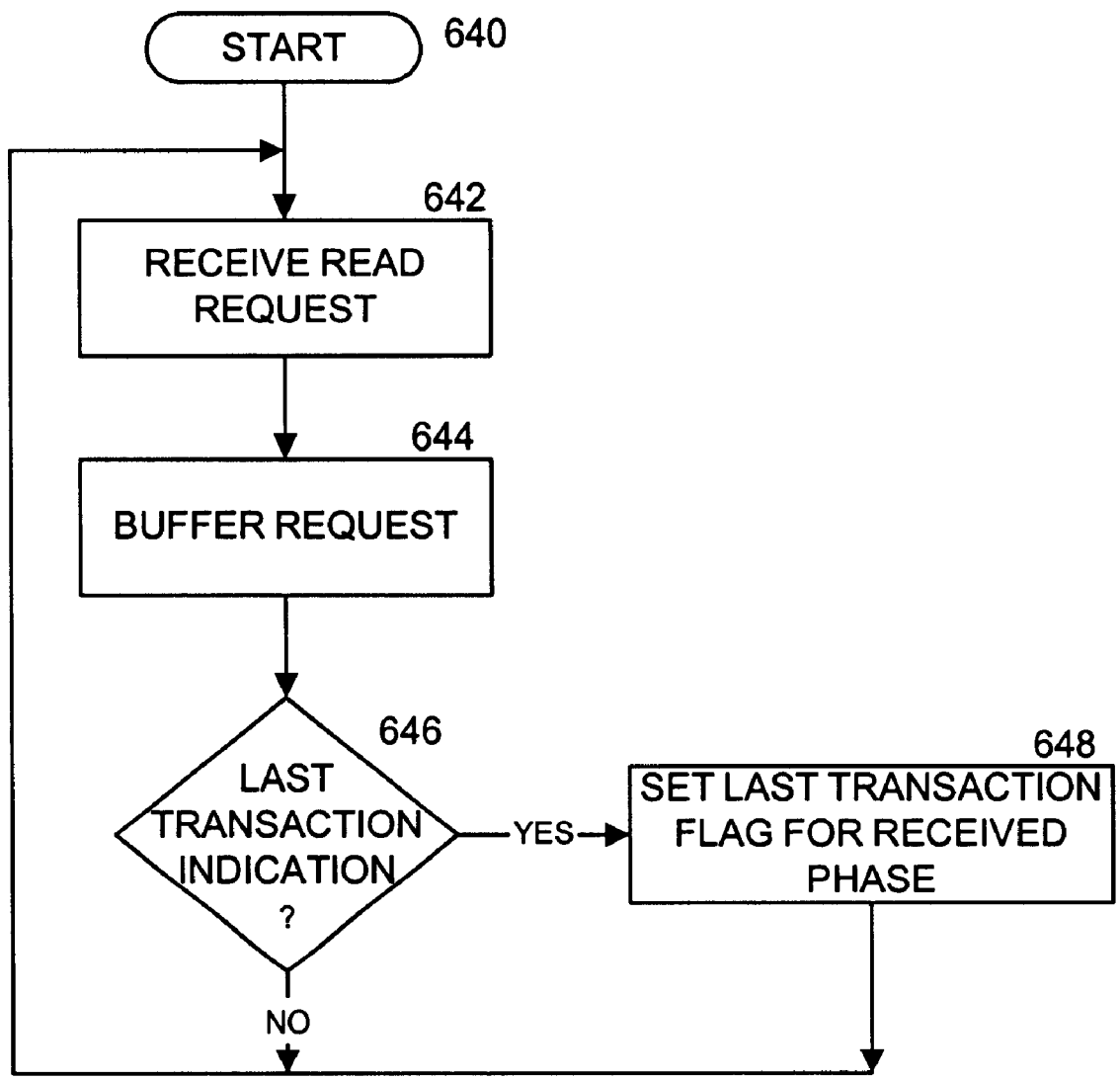
Figure 6D:
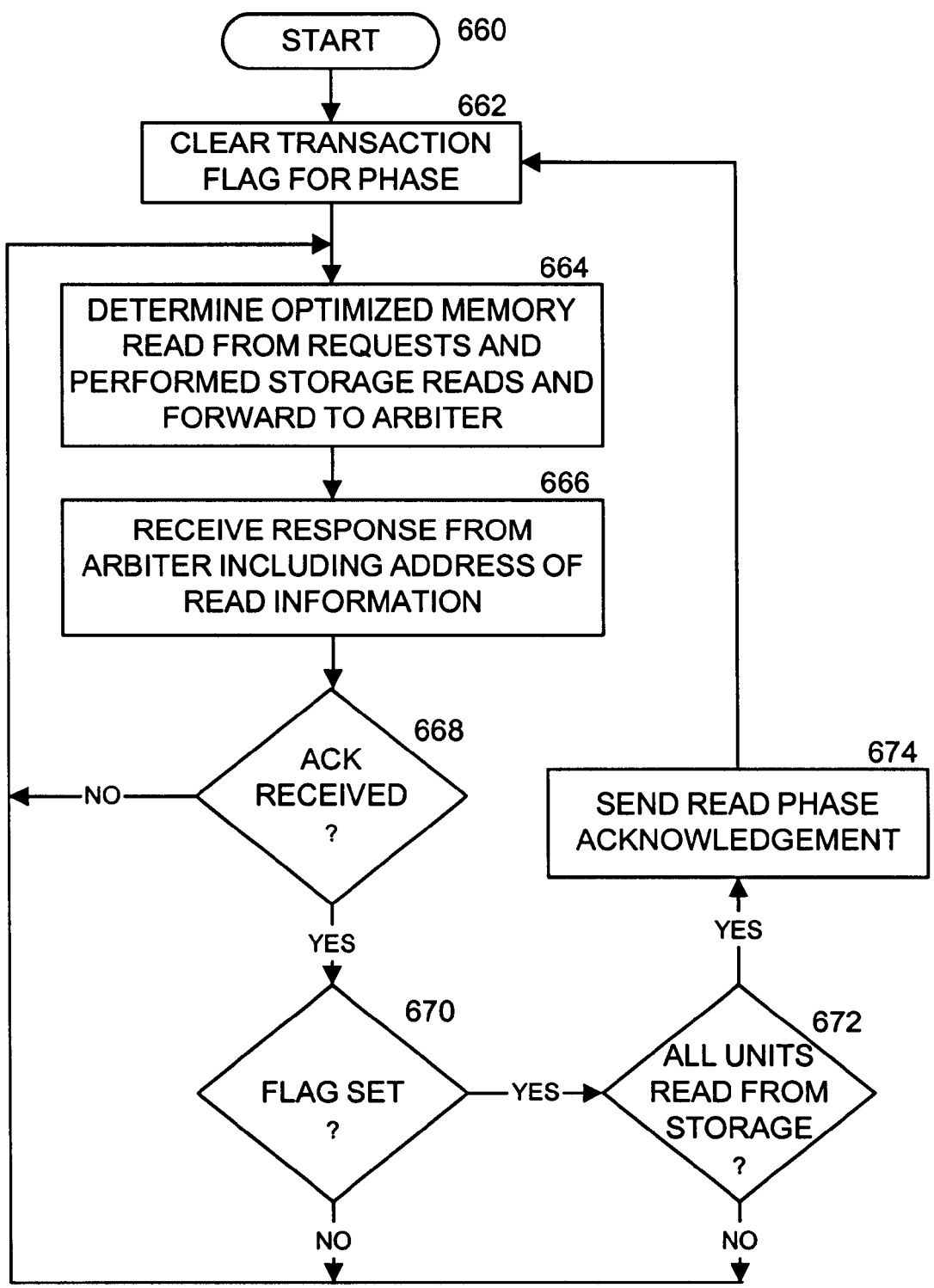

FIGS. 6C–D illustrate processes used in one embodiment of a read request machine for receiving and processing read requests. In one embodiment, there is a separate set of processes illustrated in FIGS. 6C–D for each phase, while in one embodiment, there is one set of processes handling all phases. In one embodiment, a single process illustrated in FIG. 6C is used along with multiple instances of the process illustrated in FIG. 6D, such as one for each read phase.

FIG. 6C illustrates a process used in one embodiment for receiving read requests. Processing begins with process block 640, and proceeds to process block 642, wherein a read request is received. In process block 644, the read request is buffered. Next, as determined in process block 646, if the read request includes a set last transaction indication, then a flag is set in process block 648 indicating the received read request corresponds to a last one of the received phase. Processing returns to process block 642.

FIG. 6D illustrates a process used in one embodiment for processing read requests. Processing begins with process block 660, and proceeds to process block 662, wherein the phase transaction flag is cleared. In one embodiment, there is a single phase transaction flag, while in one embodiment handling all phases, there are multiple transaction flags, typically each corresponding to a different phase. Next, in process block 664, an optimized memory read is determined from received requests and previously performed storage read operations, and these one or more memory read requests are sent to a read arbiter, such as that illustrated in FIG. 6E. In process block 666, a response is received from the arbiter after it performs one or more storage read operations from one of the phases. Typically, the response includes an indication of the address of the read information and from which phase or which read request generator generated the read request.

If, as determined in process block 668, an acknowledgement indication is received that the arbiter did not read a generated read request by the particular read request generator, then processing returns to process block 664. Otherwise, if, as determined in process block 670, the transaction flag for the current phase is not set, then processing returns to process block 664. Otherwise, if, determined in process block 672, that all the units of the current phase have not been actually read from storage, then processing returns to process block 664. Otherwise, in process block 674, a read phase acknowledgement is sent to the read request generator, such as that illustrated in FIGS. 6A–B. Note, in one embodiment, the read phase acknowledgement is sent prior to the units actually being read from storage. Processing then returns to process block 662.

Figure 6E:
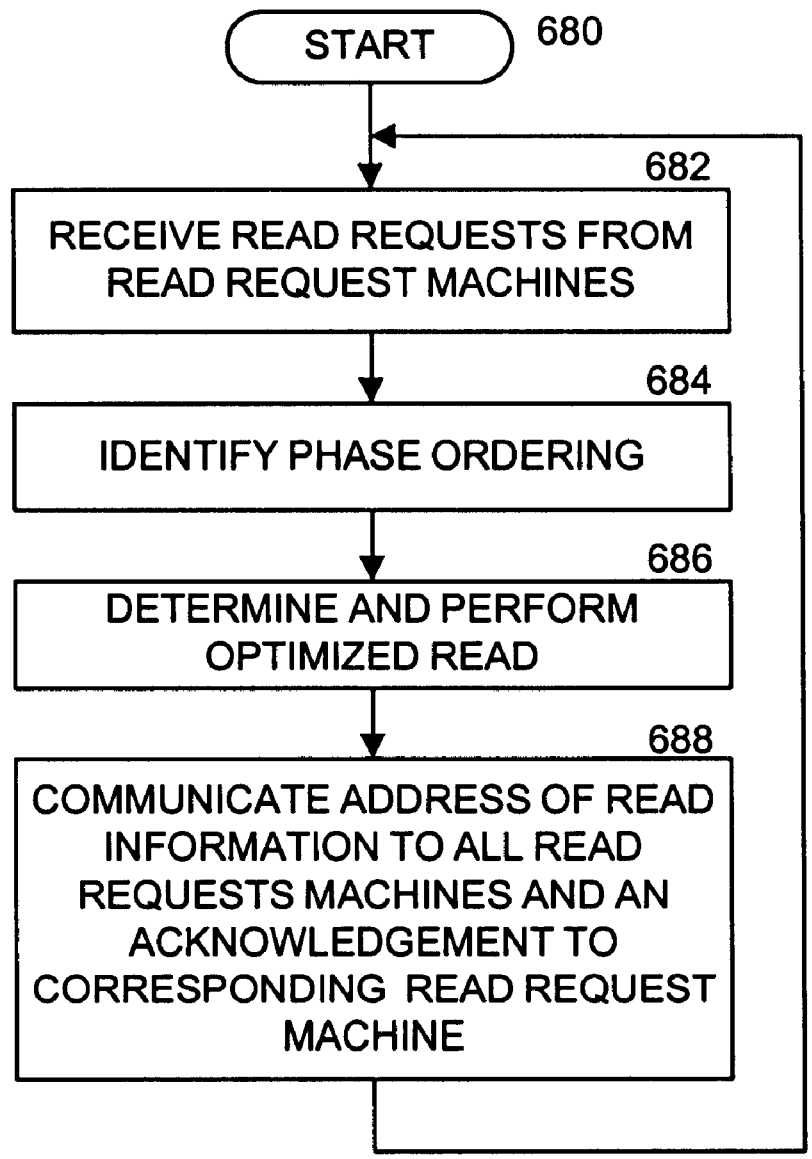

FIG. 6E illustrates a process used in one embodiment of an arbiter for receiving read requests from multiple phases and for reading the data associated with the read requests from memory or other storage. Processing begins with process block 680, and proceeds to process block 682, wherein a read request is received from each of the one or more read request machines. In process block 684, the ordering (e.g., the relative age) of the phases is identified, such as by referencing a data structure, such as data structure 260 illustrated in FIG. 2D. In process block 686, an optimized memory read is determined and performed from all buffered read requests, with preference to the earliest read phase. Next, in process block 688, each of the read request generators are provided the address of the read information for use in generating a preferred next read request, as well as an acknowledgement indication to the read request machine (or machines in one embodiment) which generated the performed read request. Processing returns to process block 682.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:
   maintaining a phase indication;
   associating a first value of the phase indication with a first plurality of storage requests;
   associating a second value of the phase indication with a second plurality of storage requests;
   forwarding the first plurality of storage requests to a storage control component;
   forwarding the second plurality of storage requests to the storage control component; and
   receiving a first acknowledgement from the storage control component that the first plurality of storage requests have been written or read by the storage control component.

2. The method of claim 1, wherein each of the first and second pluralities of storage requests are write requests.

3. The method of claim 1, wherein each of the first and second pluralities of storage requests are read requests.

4. The method of claim 1, comprising associating a last phase transaction indication with one of the first plurality of storage requests.

5. The method of claim 1, wherein the phase indication is at a particular time one of at least three possible values.

6. The method of claim 1, comprising receiving a second acknowledgement from the storage control component that the second plurality of storage requests have been written or read by the storage control component;
   wherein the first value is before the second value in a phase ordering; and the first acknowledgement is received before the second acknowledgement.

7. The method of claim 1, comprising receiving a second acknowledgement from the storage control component that the second plurality of storage requests have been written or read by the storage control component;
   wherein the first value is before the second value in a phase ordering; and the second acknowledgement is received before the first acknowledgement.

8. The method of claim 1, wherein the phase indication changes states or values in response to each occurrence of associating the phase indication with a predetermined number of the plurality of storage requests, the predetermined number greater than one.

9. The method of claim 1, wherein the phase indication changes states or values in response to each predetermined time or other measurable duration or quantity.

10. The method of claim 1, comprising maintaining an indication of an available next value for the phase indication.

11. The method of claim 10, comprising updating the indication of the available next value for the phase indication in response to the first acknowledgement.

12. The method of claim 10, wherein said maintaining an indication of the available next value for the phase indication includes maintaining a bitmap, linked list, ring buffer, counter, or other data structure or mechanism.

13. The method of claim 1, wherein said writing or reading by the storage control component of the first plurality of storage requests includes scheduling a storage operation based on the first plurality of storage requests.

14. The method of claim 1, wherein the first and second plurality of storage requests correspond to data units of a plurality of packets.

15. The method of claim 1, wherein there can be exactly three or exactly four different phases, and the phase indication represents a current phase of said exactly three or exactly four different phases.

16. A system comprising:
   means for maintaining a write phase indication;
   means for associating a first value of the write phase indication with a first plurality of memory write requests;
   means for associating a second value of the write phase indication with a second plurality of memory write requests;
   means for forwarding the first plurality of memory write requests to a memory control component;
   means for forwarding the second plurality of memory write requests to a memory control component; and
   means for receiving a first acknowledgement from the storage control component that the first plurality of memory write requests have been written by the storage control component.

17. The system of claim 16, wherein the write phase indication changes states or values in response to each occurrence of associating the phase indication with a predetermined nunber of the plurality of memory write requests, the predetermined number greater than one.

18. The system of claim 16, wherein the write phase indication changes states or values in response to each predetermined time or other measurable duration or quantity.

19. The system of claim 16, comprising means for maintaining an indication of an available next value for the write phase indication.

20. The system of claim 19, comprising means for updating the indication of the available next value for the write phase indication in response to the first acknowledgement.

21. The system of claim 16, wherein the first and second plurality of write requests correspond to data units of a plurality of packets.

22. A system comprising:
  means for maintaining a read phase indication;
  means for associating a first value of the read phase indication with a first plurality of memory read requests;
  means for associating a second value of the read phase indication with a second plurality of memory read requests;
  means for forwarding the first plurality of memory read requests to a memory control component;
  means for forwarding the second plurality of memory read requests to a memory control component; and
  means for receiving a first acknowledgement from the storage control component that the first plurality of memory read requests have been read by the storage control component.

23. The system of claim 22, wherein the read phase indication changes states or values in response to each occurrence of associating the phase indication with a predetermined number of the plurality of memory read requests, the predetermined number greater than one.

24. The system of claim 22, wherein the read phase indication changes states or values in response to each predetermined time or other measurable duration or quantity.

25. The system of claim 22, comprising means for maintaining an indication of an available next value for the read phase indication.

26. The system of claim 25, comprising means for updating the indication of the available next value for the read phase indication in response to the first acknowledgement.

27. The system of claim 22, wherein the first and second plurality of read requests correspond to data units of a plurality of packets.

28. A system comprising:
  a memory write request generator for generating a plurality of sets of write requests, wherein each of the plurality of sets of write requests are identified with a phase indication;
  a memory control device, coupled to the memory write request generator, for receiving the plurality of sets of write requests and for communicating a particular one of a plurality of acknowledgements to the memory write request generator in response to a particular one of the set of write requests being written; and
  a memory element for storing data associated with the plurality of write requests;
  wherein the memory write request generator applies a particular phase indication to a single set of write requests until a corresponding acknowledgment is received from the memory control device.

29. The system of claim 28, wherein the phase indication includes at a particular time one of at least three possible values.

30. The system of claim 28, wherein the write phase indication changes states or values in response to each occurrence of associating the phase indication with a predetermined number of the plurality of memory write requests, the predetermined number greater than one.

31. The system of claim 28, wherein the write phase indication changes states or values in response to each predetermined time or other measurable duration or quantity.

32. The system of claim 28, wherein said writing of the first plurality of memory write requests includes scheduling a memory write operation based on the first plurality of memory write requests.

33. The system of claim 28, wherein the plurality of sets of write requests correspond to data units of a plurality of packets.

34. A system comprising:
  a memory read request generator for generating a plurality of sets of read requests, wherein each of the plurality of sets of read requests are identified with a respective read phase indication;
  a memory control device, coupled to the memory read request generator, for receiving the plurality of sets of read requests and for communicating a particular one of a plurality of acknowledgements to the memory read request generator in response to a particular one of the set of read, requests being read; and
  a memory element for reading data associated with the plurality of read requests;
  wherein the memory read request generator applies a particular read phase indication to a single, set of read requests until a corresponding read acknowledgment is received from the memory control device.

35. The system of claim 34, wherein the read phase indication includes at a particular time one of at least three possible values.

36. The system of claim 34, wherein the read phase indication changes states or values in response to each occurrence of associating the read phase indication with a predetermined number of the plurality of memory read requests, the predetermined number greater than one.

37. The system of claim 34, wherein the read phase indication changes states or values in response to each predetermined time or other measurable duration or quantity.

38. The system of claim 34, wherein said reading of the first plurality of memory read requests includes scheduling a memory read operation based on the first plurality of memory read requests.

39. The system of claim 34, comprising:
  a memory write request generator for generating a plurality of sets of write requests, wherein each of the plurality of sets of write requests are identified with a respective write phase indication; and
  a scheduler for scheduling read to and write from operations on the memory element based on the plurality of sets of read requests and the plurality of sets of write requests;
  wherein the memory control device is coupled to the memory write request generator, the memory control device configured to receive the plurality of sets of write requests and to communicate a particular one of a plurality of write acknowledgements to the memory write request generator in response to a particular one of the set of write requests being written; and
  wherein the memory write request generator applies a particular write phase indication to a single set of write requests until a corresponding write acknowledgment is received from the memory control device.

40. The system of claim 39, wherein the plurality of sets of read requests and the plurality of sets of write requests correspond to data units of a plurality of packets.

41. The system of claim 34, wherein the plurality of sets of read requests correspond to data units of a plurality of packets.

* * * * *

UNITED STATES PATENT AND TRADEMARK OFFICE
CERTIFICATE OF CORRECTION

PATENT NO.    : 6,715,046 B1
DATED         : March 30, 2004
INVENTOR(S)   : Shoham et al.

It is certified that error appears in the above-identified patent and that said Letters Patent is hereby corrected as shown below:

Column 6,
Line 20, replace "221-219" with -- 221-229 --.

Column 12,
Line 56, replace "nunber" with -- number --.

Column 14,
Line 17, replace "read, requests" with -- read requests --.
Line 21, replace "single, set" with -- single set --.

Signed and Sealed this

Sixth Day of September, 2005

JON W. DUDAS
*Director of the United States Patent and Trademark Office*